US006415157B1

(12) United States Patent
Kato (10) Patent No.: US 6,415,157 B1
(45) Date of Patent: Jul. 2, 2002

(54) PERSONAL HANDYPHONE SYSTEM (PHS) MOBILE RADIO STATION WITH EFFICIENT RESYNCHRONIZATION CAPABILITY

(75) Inventor: Kenichi Kato, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/384,645

(22) Filed: Aug. 27, 1999

(30) Foreign Application Priority Data

Aug. 28, 1998 (JP) .......................................... 10-242741

(51) Int. Cl.⁷ ................................................ H04Q 7/20
(52) U.S. Cl. ...................... 455/550; 455/422; 455/434; 455/502; 375/356
(58) Field of Search ................................ 455/550, 422, 455/434, 502; 375/356, 357, 359

(56) References Cited

U.S. PATENT DOCUMENTS

| | | | | |
|---|---|---|---|---|
| 5,537,685 A | * | 7/1996 | Matsumo | 455/51.1 |
| 5,594,761 A | * | 1/1997 | Brown | 375/356 |
| 5,636,243 A | * | 6/1997 | Tanaka | 375/219 |
| 5,920,557 A | * | 7/1999 | Hirata | 370/350 |
| 6,016,430 A | * | 1/2000 | Shinomiya | 455/515 |
| 6,134,448 A | * | 10/2000 | Shoji | 455/456 |
| 6,198,784 B1 | * | 3/2001 | Archambaud | 375/371 |
| 6,201,499 B1 | * | 3/2001 | Hawkes | 342/387 |
| 6,219,347 B1 | * | 4/2001 | Uchida | 370/347 |
| 6,226,505 B1 | * | 5/2001 | Uda | 455/255 |
| 6,236,869 B1 | * | 5/2001 | Adachi | 455/572 |
| 6,266,536 B1 | * | 7/2001 | Janky | 455/503 |
| 2001/0019952 A1 | * | 9/2001 | Ishida | 455/414 |

FOREIGN PATENT DOCUMENTS

| | | |
|---|---|---|
| JP | 4-371028 | 12/1992 |
| JP | 8-331628 | 12/1996 |
| JP | 9-322243 | 12/1997 |

OTHER PUBLICATIONS

"Second Generation Cordless Telephone System Standard Version 2 (Revision 2), RCR STD–28", Association of Radio Industries and Businesses, p. 59, Jun. 1996.

* cited by examiner

*Primary Examiner*—William Trost
*Assistant Examiner*—Marcos L. Torres
(74) *Attorney, Agent, or Firm*—Scully, Scott, Murphy & Presser (57) ABSTRACT

The present invention provides a PHS mobile radio station, which can efficiently attain resynchronization when the wave interference between radio control signals sent from base stations (BS) occurs and no synchronization therebetween cannot be established. The PHS mobile radio station of the present invention has a memory unit for latching the time difference between the transmission times of control signals through logical control channels respectively corresponding to two control frequencies. During this mobile radio station receives control signals in synchronization with the logical control channel (LCCH) corresponding to one of the two control frequencies, if an abnormality in the LCCH synchronization state occurs owing to wave interference, the mobile radio station controls a timing generation unit and a frequency changing unit according to information memorized in the memory unit so that the reception of control signals is synchronized with the logical control channel corresponding to the other control frequency. Thus, this PHS mobile radio station, which can efficiently attain resynchronization.

7 Claims, 8 Drawing Sheets

① CONTROL SIGNAL TRANSMITTED ON FIRST CONTROL FREQUENCY
② CONTROL SIGNAL TRANSMITTED ON SECOND CONTROL FREQUENCY

FIG. 9

# PERSONAL HANDYPHONE SYSTEM (PHS) MOBILE RADIO STATION WITH EFFICIENT RESYNCHRONIZATION CAPABILITY

BACKGROUND OF THE INVENTION

The present invention relates to a mobile radio station for use in a business PHS (personal handyphone system).

Hereinafter, a conventional business PHS will be described. In the business PHS system, a plurality of connection or base stations (hereunder referred to as "BSs") are connected to a PBX (private branch exchange). Each of the BSs is operative to intermittently transmit control data, which is represented by a control signal, in blocks to a mobile radio personal station (hereunder referred to as "a PS") in a constant period of not less than 125 ms.

The control data comprises blocks respectively corresponding to several kinds of logical channels, such as BCCH (broadcast control channel), SCCH (signaling control channel) and PCH (paging channel). The block corresponding to the BCCH is periodically transmitted as the leading one of the blocks to be transmitted in a predetermined order. The logical channels respectively corresponding to these blocks represented by the control signal are referred to as "LCCHs" (logical control channels).

The PHS makes a search on the LCCHs, which are transmitted from the BSs, for a LCCH, which can be received by the PS. This search is referred to as a "LCCH search". Then, the PS performs the intermittent reception of a LCCH, which is selected as a result of the "LCCH search", with the timing of selection of this LCCH. This is referred to as "LCCH (logical control channel) synchronization establishment".

The frequency of the control signal is common to the BSs. Thus, each of the BSs carrier-senses at the initiation of transmission of the control signal so that no interference occurs between control signals respectively transmitted from the BSs. Consequently, no conflict occurs between the transmission times of control signals from the BSs.

The business PHS can achieve the parallel transmission of control signals, which represent the same control data and respectively have two different frequencies. In this case, the transmission times of the control signals of two frequencies are shifted from each other in the BS.

When the control signals having two different frequencies are transmitted from each of the BSs, the PS can achieve the LCCH synchronization establishment correspondingly to a given control signal from an arbitrary one of the BSs by performing the LCCH search.

Hereinafter, the LCCH search and the LCCH synchronization establishment to be performed in the PS will be described.

The PS receives control signals from a plurality of BSs. Therefore, immediately after the power is turned on, or when the PS moves into a service area from outside the service area (that is, from an area in which no radio waves transmitted from the BSs reach the PS), the PS performs the LCCH search so as to determine one of the BSs, which transmits a control signal that the PS should await. According to the PS-ID (identification information) peculiar to the PS, the PHS determines which of the two (control) frequencies of the control signals transmitted from each of the BSs is the (preferential) frequency of the control signals preferentially searched by the LCCH search. The preferential frequency and the other frequency are determined as first and second control frequencies, respectively. The PS decides to first perform the LCCH search on the control signals of the first control frequency.

The PS receives the control signals of the first control frequencies from the BSs and performs the LCCH search thereon. The PS chooses the BS having an ID, with which the PS can communicate, according to LCCH information. Then, the PS selects the LCCH having the highest electric field strength as an object LCCH from the corresponding LCCHs each having the electric field strength that is not lower than a predetermined threshold value. The LCCH synchronization establishment is performed on the selected LCCH.

When no object LCCH is found by the LCCH search performed correspondingly to the first control frequency, the PS performs the LCCH search on the control signals of the second control frequency.

If an object LCCH is found by the LCCH search performed correspondingly to the second control frequency, the LCCH synchronization establishment is performed correspondingly to the second control frequency.

Conversely, when no object LCCH is found by the LCCH search corresponding to the second control frequency, the PS performs an outside-the-service-area process to be performed when the PS is out of the service area.

In the case that the PS undergoes wave interference during the LCCH synchronization state thereof and thus an abnormality in the synchronization state occurs, the PS performs the following operation to be described hereinbelow.

In the case that the PS is in the LCCH synchronization establishment state at the first or second control frequency, when wave interference occurs, an abnormality in the LCCH synchronization state is caused.

The PS newly performs a LCCH search at the control frequency at which the LCCH synchronization establishment is achieved. When an object LCCH is found, the PS performs a LCCH synchronization establishment.

When no object LCCH is found, the PS performs a LCCH search at the other control frequency. Conversely, when an object LCCH is found, the PS performs the LCCH synchronization establishment at this control frequency.

Moreover, when no object LCCH is found, the PS performs the outside-the-area process.

Further, the related art is described in the Japanese Unexamined Patent Publication Nos. 9-322243, 4-371028 and 8-331628 Official Gazettes and "Second Generation Cordless Telephone System Standard Version 2 (Revision 2) RCR STD-28", Association of Radio Industries and Businesses, p. 59, June 1996.

However, the aforementioned conventional mobile radio station has the following drawbacks.

In the case that an abnormality in the LCCH synchronization state occurs owing to wave interference in the conventional mobile radio station, an operation similar to the LCCH search operation is performed so as to achieve LCCH resynchronization. Thus, it takes time for the PS to return to the LCCH synchronization establishment normal state.

When an abnormality in the LCCH synchronization state occurs, the PS is in an out-of-the-service-area state. In the case that BSs of different business PHSs are close to each other, the transmission times of signals between the BSs are asynchronous to each other. Consequently, the frequency of occurrences of wave interference between the control signals increases.

To prevent the interference between the control signals, for example, the Japanese Unexamined Patent Publication No. 9-322243 proposed a method for monitoring the interference between the control signals at the time of transmission thereof in the BSs and changing the transmission time of the control signal when an interference wave is detected.

However, although the aforementioned method achieves the avoidance of occurrences of the interference between the control signals, an abnormality in the LCCH synchronization state occurs in the PS having attained the LCCH synchronization establishment correspondingly to the control signal. Thus, the PS should newly perform a LCCH search. Consequently, it takes time to achieve the LCCH synchronization establishment again.

SUMMARY OF THE INVENTION

Accordingly, an object of the present invention is to provide a PHS mobile radio station, which can efficiently attain resynchronization when the wave interference between radio control signals sent from base stations (BS) occurs and no synchronization therebetween cannot be established.

To achieve the foregoing object, according to the present invention, there is provided a PHS mobile radio station, which has a memory unit for latching the time difference between the transmission times of control signals through logical control channels respectively corresponding to two control frequencies. During this radio station receives control signals in synchronization with the logical control channel (LCCH) corresponding to one of the two control frequencies, if an abnormality in the LCCH synchronization state occurs owing to wave interference, this mobile radio station controls a timing generation unit and a frequency changing unit on the basis of information memorized in the memory unit so that the reception of control signals is synchronized with the logical control channel corresponding to the other control frequency.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Figure 1:
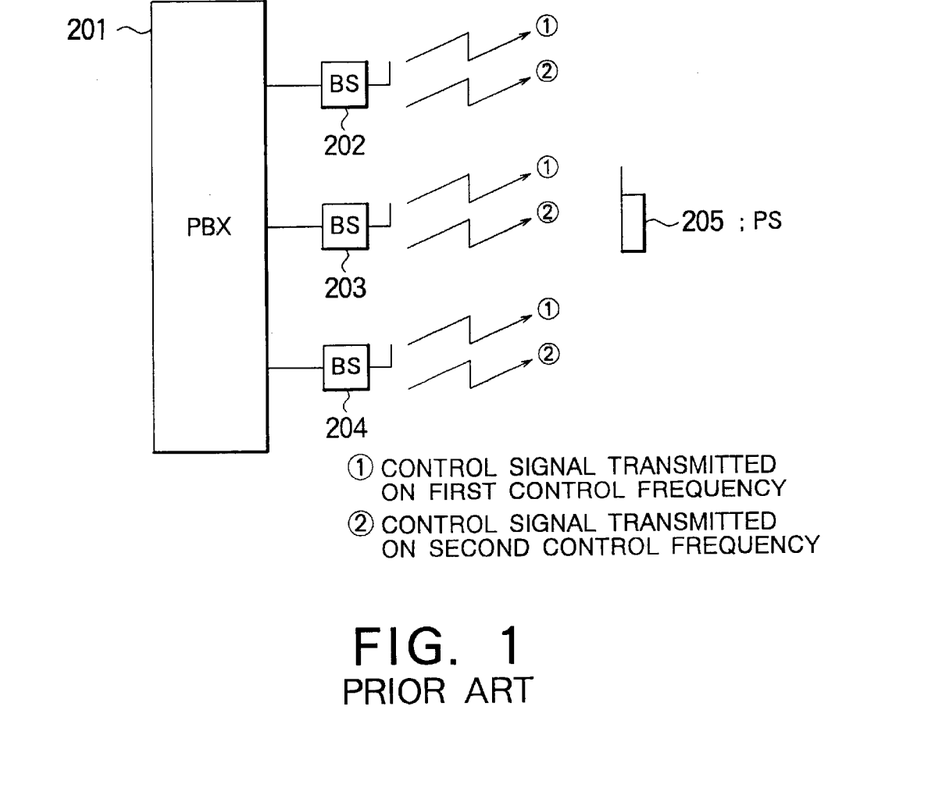
FIG. 1 is a diagram showing a conventional business PHS.

Hereinafter, first, a conventional business PHS is described with reference to the accompanying drawings. As shown in FIG. 1, in the business PHS system, a plurality of connection or base stations (referred to as "BSs") 202 to 204 are connected to a PBX (private branch exchange) 201. Each of the BSs 202 to 204 is operative to intermittently transmit control data, which is represented by control signal ① transmitted on first control frequency and control signal ② transmitted on second control frequency, in blocks to a mobile radio personal station (referred to as a "a PS") 205 in a constant period of not less than 125 ms, as illustrated in FIG. 2.

Figure 2:
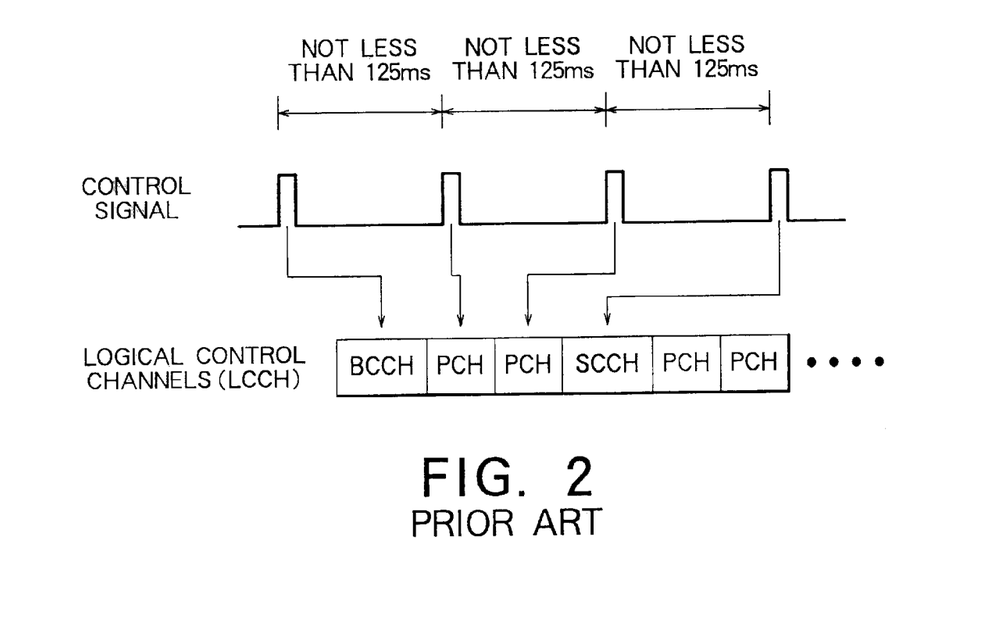
FIG. 2 is a timing chart illustrating the conventional timing of transmission of a control signal.

As seen in the format illustrated in FIG. 2, the control data includes blocks respectively corresponding to several kinds of logical channels, such as BCCH (broadcast control channel), SCCH (signaling control channel) and PCH (paging channel). The block corresponding to the BCCH is periodically transmitted as the leading one of the blocks to be transmitted in a predetermined order. The logical channels respectively corresponding to these blocks represented by the control signal are referred to as "LCCHs" (logical control channels).

To search a LCCH which can be received by the PS among each of LCCHs, which are transmitted from each of BSs respectively, is referred to as a "LCCH search". Further, to receive a LCCH intermittently, which is selected as a result of the "LCCH search", with the timing of selection of this LCCH by the PS is referred to as "LCCH (logical control channel) synchronization establishment".

The frequencies of control signals are common to the BSs. Thus, at the start of transmission of the-control signal, each of the BSs carrier-senses so that no interference occurs between control signals respectively transmitted from the BSs and that no conflict occurs between the transmission times of the control signals from the BSs.

Figure 3:
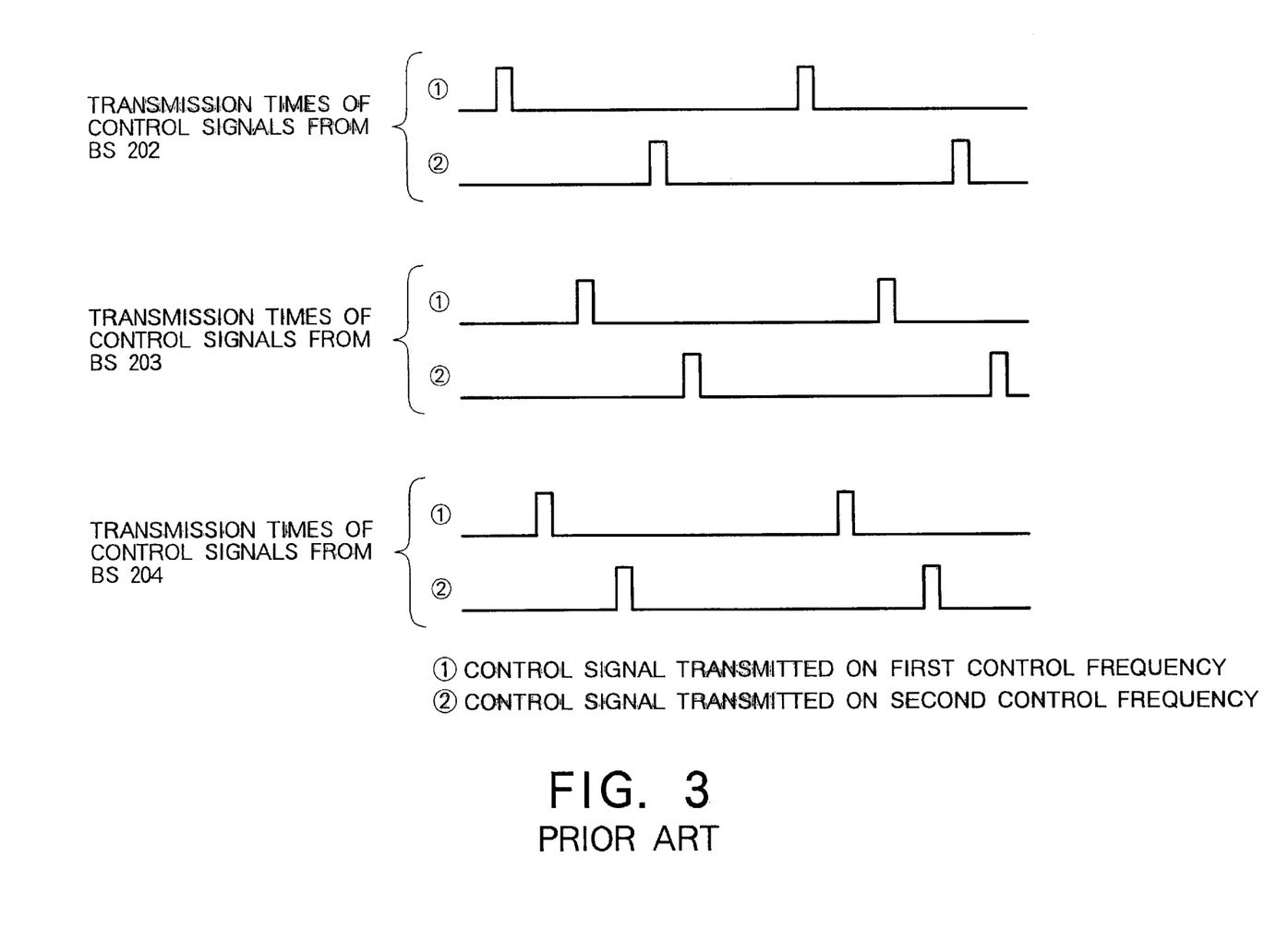
FIG. 3 is a timing chart illustrating the timing of transmission of control signals having first and second control frequencies from a plurality of BSs.

As is seen from FIG. 3, the business PHS can perform the parallel transmission of control signals, which represent the same control data and respectively have two frequencies. In this case, the transmission times of the control signals ① and ② of two frequencies are shifted from each other in the corresponding BS.

When the control signals of two frequencies are transmitted from each of the BSs, the PS can perform the LCCH synchronization establishment on a given control signal from an arbitrary one of the BSs by performing the LCCH search.

Figure 4:
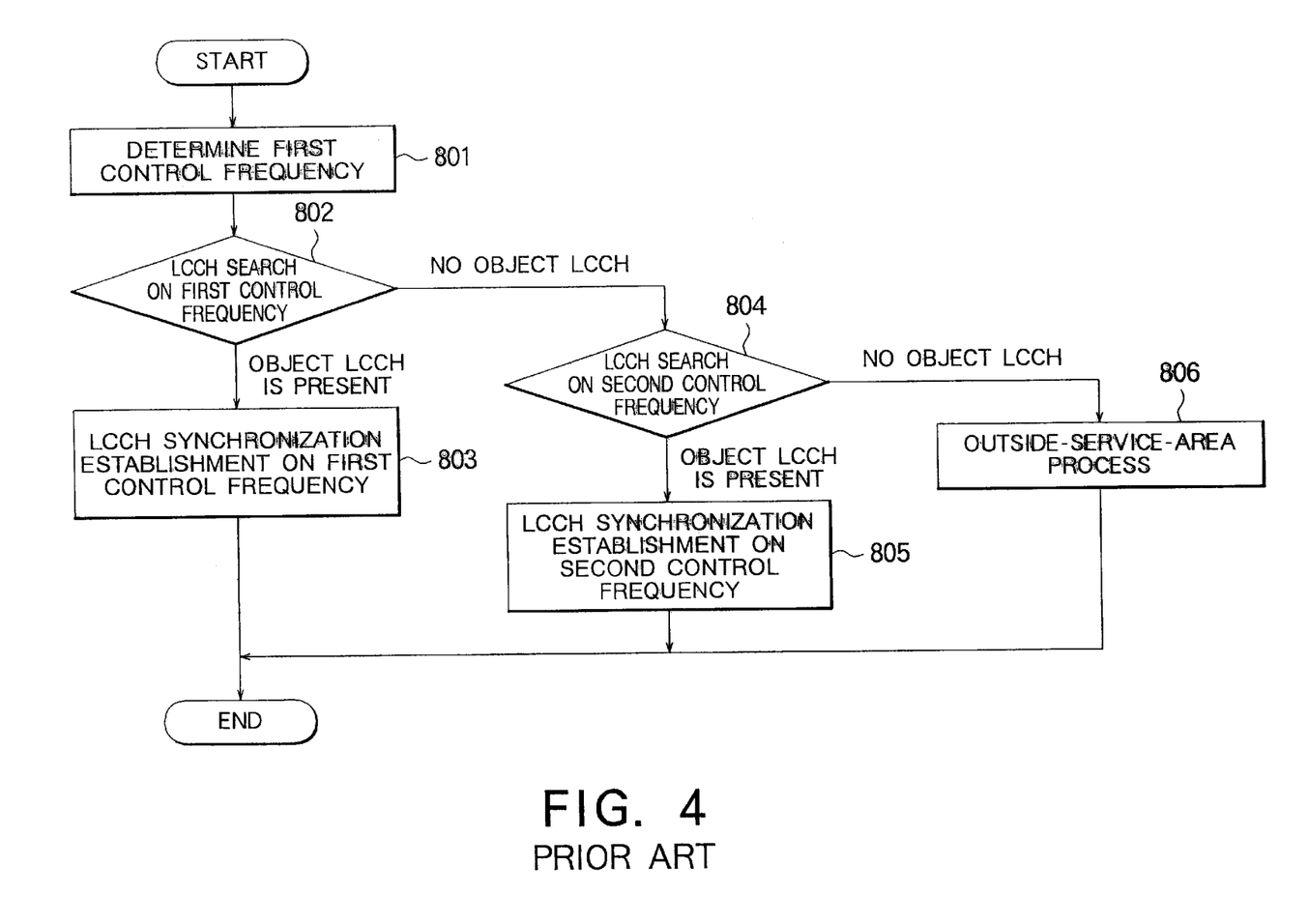
FIG. 4 is a flowchart illustrating a LCCH search operation of the conventional mobile radio station.

Hereinafter, the LCCH search and the LCCH synchronization establishment to be performed in the PS 205 will be described by referring to FIG. 4.

The PS 205 receives control signals from a plurality of BSs. Thus, just after the power is turned on, or when the PS 205 moves into a service area from an area in which no radio waves coming from the BSs reach there, outside the service area, the PS 205 performs the LCCH search so as to determine one of the BSs, which transmits a control signal that the PS 205 awaits. A PS-ID (identification information) peculiar to the PS 205 determines which of the two control frequencies of the control signals transmitted from each of the BSs is the preferential frequency of the control signals preferentially searched by the LCCH search. When the preferential frequency and the other frequency are determined as first and second control frequencies, respectively, the PS 205 decides (in step 801) to first perform the LCCH search on the control signals of the first control frequency.

The PS 205 receives the control signals of the first control frequencies from the BSs and then performs the LCCH search thereon. The PS 205 chooses the BS having an ID, with which the PS 205 can communicate, according to information on the LCCHs. Then, the PS 205 selects the LCCH having the highest electric field strength as an object LCCH from the corresponding LCCHs each having the electric field strength that is not lower than a predetermined threshold value (in step 802). The LCCH synchronization establishment is performed on the selected LCCH (in step 803).

When no object LCCH is found by the LCCH search conducted correspondingly to the first control frequency, the PS 205 performs the LCCH search on the control signals of the second control frequency (in step 804).

If an object LCCH is found by the LCCH search performed correspondingly to the second control frequency, the LCCH synchronization establishment is performed (in step 805) correspondingly to the second control frequency.

Conversely, if no object LCCH is found even when the LCCH search corresponding to the second control frequency is performed, the PS 205 performs an outside-the-service-area process (in step 806) to be performed when the PS 205 is outside the service area.

Figure 5:
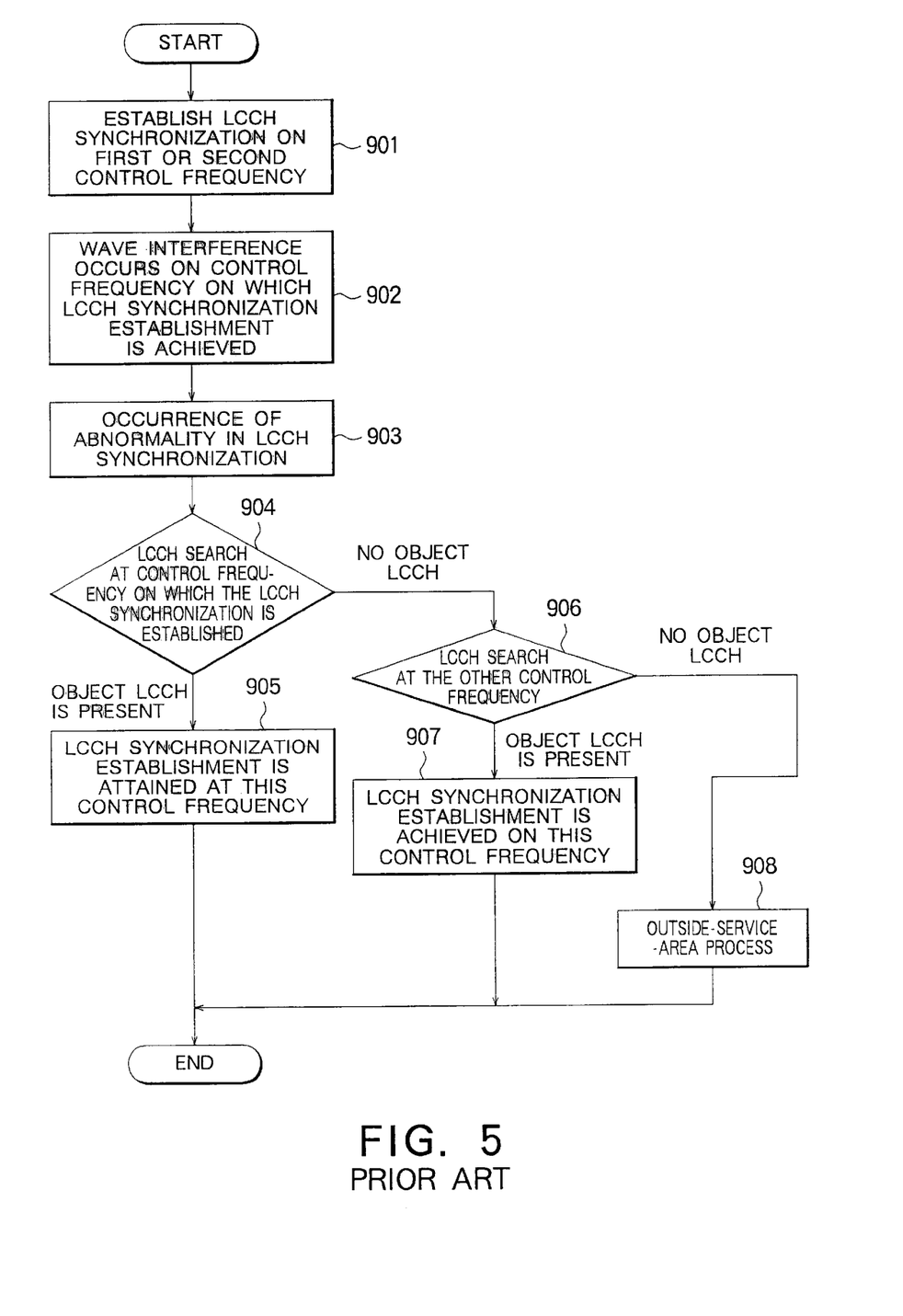
FIG. 5 is a flowchart illustrating an operation of the conventional mobile radio station when an abnormality in the LCCH synchronization state occurs.

In the case that the PS 205 undergoes wave interference during the LCCH synchronization state thereof and thus an abnormality in the synchronization state occurs, the PS 205 performs an operation that will be described hereinbelow by referring to FIG. 5.

In the case that the PS 205 is in the LCCH synchronization establishment state at the first or second control frequency (in step 901), when wave interference occurs at the same frequency (in step 902), an abnormality in the LCCH synchronization state is caused (in step 903).

The PS 205 newly performs a LCCH search (in step 904) at the control frequency at which the LCCH synchronization establishment is achieved. When an object LCCH is found, the PS 205 performs a LCCH synchronization establishment (in step 905).

When no object LCCH is found, the PS 205 performs a LCCH search at the other control frequency (in step 906). Conversely, when an object LCCH is found, the PS 205 performs the LCCH synchronization establishment at this control frequency (in step 907).

Moreover, when no object LCCH is found, the Ps performs the outside-the-area process (in step 908).

Figure 6:
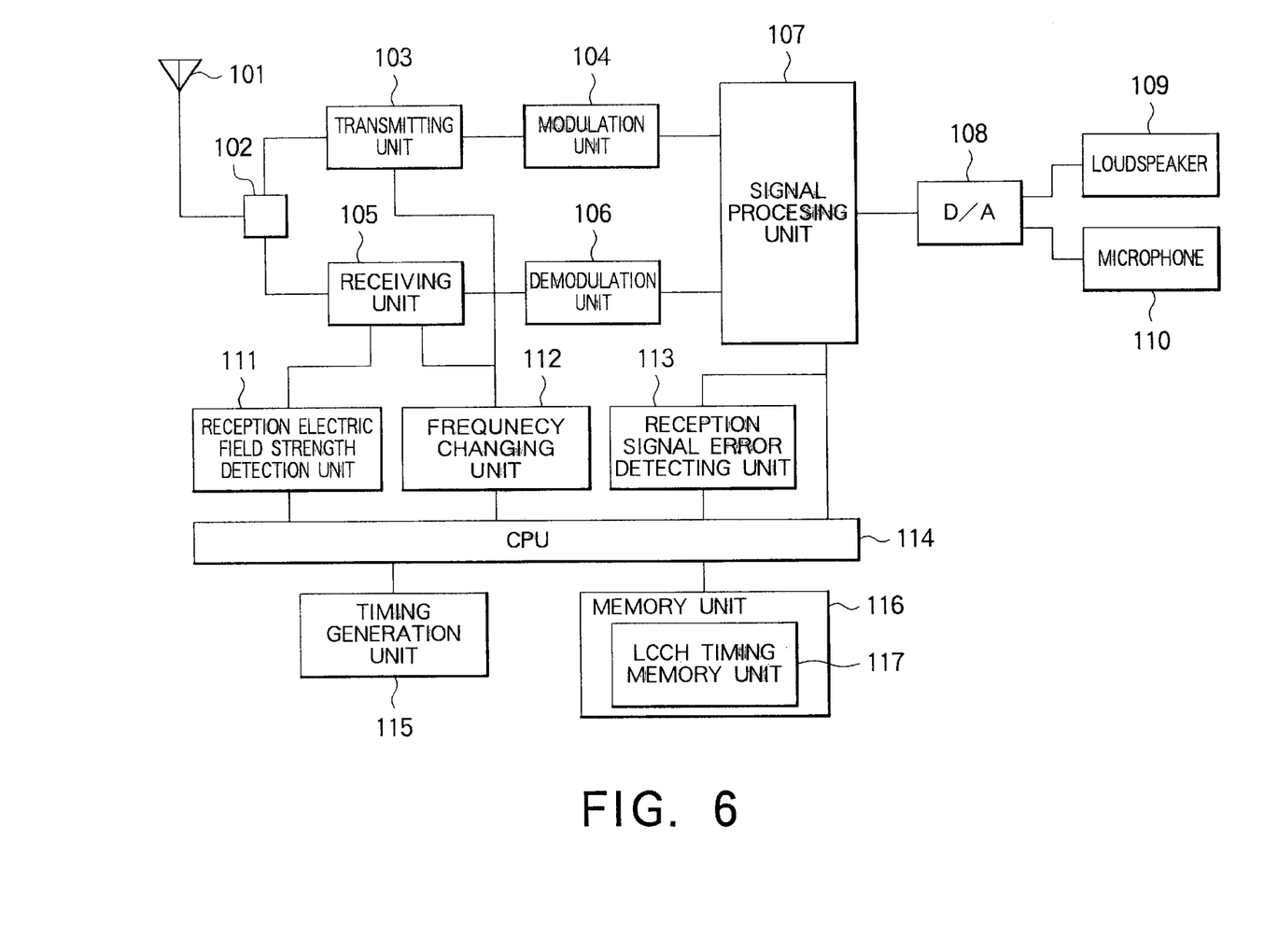
FIG. 6 is a diagram showing the configuration of a PHS mobile radio station of the present invention.

Next, an embodiment of the present invention will be described hereinbelow. FIG. 6 is a diagram showing the configuration of a PHS mobile radio personal station (referred to as a "PS"). Referring to FIG. 6, control signals transmitted from the base station (referred to as a "BS") are sent to a CPU 114 through a receiving unit 105, a demodulation unit 106 and a signal processing unit 107. Then, data represented by the control signals is processed by the CPU 114. The data represented by the control signals are included in data corresponding to logical control channels (referred to as LCCH). The PS 205 is put in a wait state by establishing the LCCH synchronization.

The control signals representing the same data are transmitted from each of the BSs 202 to 204 in parallel at two frequencies. The PS 205 is adapted to latch data representing the time difference between the transmission times of the control signals, which are transmitted through the LCCHs at the aforementioned two frequencies, in a LCCH timing memory unit 117.

In the case that the PS 205 receives control signals is performed in synchronization with the logical control channel (LCCH) corresponding to one of the two control frequencies and that an abnormality in the LCCH synchronization occurs owing to wave interference, the PS 205 controls a timing generation unit 115 and a frequency changing unit 112 according to information memorized in the LCCH timing memory unit 117. The PS 205 subsequently resynchronizes the reception of control signals with the logical control channel corresponding to the other control frequency, so that the PS 205 is prevented from being brought into an outside-the-service-area state owing to wave interference.

In the case of the business PHSs, the reception and transmission of radio signals between the BSs are usually synchronized with each other in the same system. Therefore, the interference between speech signals or between control signals does not frequently occur in the same system. However, in the case that difference systems adjoin each other, radio signals transmitted from BSs of the different systems are not synchronized with each other. Thus, the interference between the speech signals or between the control signals may happen frequently.

In this case, every time an abnormality in the LCCH synchronization occurs owing to wave interference, a LCCH search operation is performed in the conventional business PHS. The PS 205 cannot perform call origination and acceptance during this LCCH search operation. The wave interference between control signals transmitted from the BSs of the different system is the interference between the control signals intermittently transmitted. This results in low risk of the interference between control signals of the frequency, which is different from that of the interfered control signals.

According to the embodiment of the present invention, the PS 205 latches data indicating the two kinds of the transmission times of the control signals representing the LCCHs. Thus, even if wave interference occurs at one of the two control frequencies, the LCCH synchronization establishment is immediately achieved at the other control frequency. Consequently, even when an abnormality takes place owing to wave interference in the LCCH synchronization, the risk of causing a time period, in which the PS 205 cannot perform call origination and acceptance, is very low.

FIG. 6 is a diagram illustrating the configuration of an embodiment of the present invention. As illustrated in FIG. 6, the PS performs the transmission and reception of speech signals between users through a loudspeaker 109 and a microphone 110 during a call. The speech signal undergoes a digital-to-analog conversion in a digital-to-analog converter (D/A) 108. Then, the resultant digital signal is processed in the signal processing unit 107. Namely, the signal sent from the signal processing unit 107 is converted by the digital-to-analog converter into an analog signal. Conversely, a signal sent from the microphone 110 is converted into a digital signal by an analog-to-digital converter. Then, the resultant digital signal is inputted to the signal processing unit 107. In addition to the speech signal, the signal processing unit 107 processes signals to be used for controlling the call origination and acceptance.

The transmission of a signal from the PS to the BS is performed through a modulation unit 104, a transmitting unit 103, a transmission/reception switching unit 102 and an antenna 101. On the other hand, the reception of a signal from the BS to the PS is performed through the antenna 101, the transmission/reception switching unit 102, a receiving unit 105 and a demodulation unit 106.

An electric-field-strength detecting unit 111 is operative to detect the electric field strength of the received signal and sends information on the detected electric field strength to the CPU 114.

In the case of the PHSs, a transmission channel and a reception channel are managed in time slots. The timing of use of these channels is established according to information provided by the timing generation unit 115. Incidentally, the timing thereof is realized by controlling the transmitting unit 103 and the receiving unit 105 by means of the CPU 114.

The frequency to be used is freely designated correspondingly to each of the time slots and is controlled by the frequency changing unit 112.

The CPU 114 controls each of the blocks according to programs and data memorized in the memory unit 116.

In the case of this embodiment, the memory unit 116 has a LCCH timing memory unit 117. This memory unit 116 latches the timing relation between the control signals respectively corresponding to the two control frequencies, which are sent from the BSs.

An operation of an embodiment of the present invention will be described hereunder with reference to FIG. 6. When the power is turned on, the PS searches the control signals sent from the BSs by performing the following procedure.

The CPU 114 first controls the frequency changing unit 112 and sets the control frequency so that the receiving unit 105 can receive the control signals at such a control frequency.

The electric field strength of each of the received control signals is measured by the received electric field strength detecting unit 111. Further, data represented by the control signals are recognized by the signal processing unit as indicating the LCCHs.

A reception signal error detecting unit 113 calculates an error rate from a CRC (cyclic redundancy check code) added per unit blocks of the LCCHs.

The CPU 114 selects an optimum LCCH on the basis of LCCH data information received from the signal processing unit 107, electric-field-strength information of each of the LCCHs, which is received from the reception electric field strength detecting unit 111, and error rate information of each of the LCCHs, which is sent from the reception signal detecting unit 113. Further, the CPU 114 controls the timing generation unit 115 so that the reception of control signals is synchronized with this selected LCCH.

The control signals sent from the BSs have two control frequencies. Therefore, the CPU 114 controls the frequency changing unit 112 and searches the control signals representing the selected LCCH, which are sent from the corresponding BSs, for the control signal of the other control frequency A method of searching the control signals having the latter control frequency is the same as the method of searching the precedently selected LCCH. Incidentally, in the case of employing the method of searching the control signals for the latter LCCH, the CPU 114 searches the control signals transmitted from the BSs having transmitted the control signals representing the precedent LCCH. Thus, additional ID peculiar to each of the BS is adopted as a search condition.

Upon completion of the search for the control signal representing the LCCH, which has the latter control frequency, the CPU 114 causes the LCCH timing memory unit 117 to latch the LCCH timing information having each of the two control frequencies.

Figure 7:
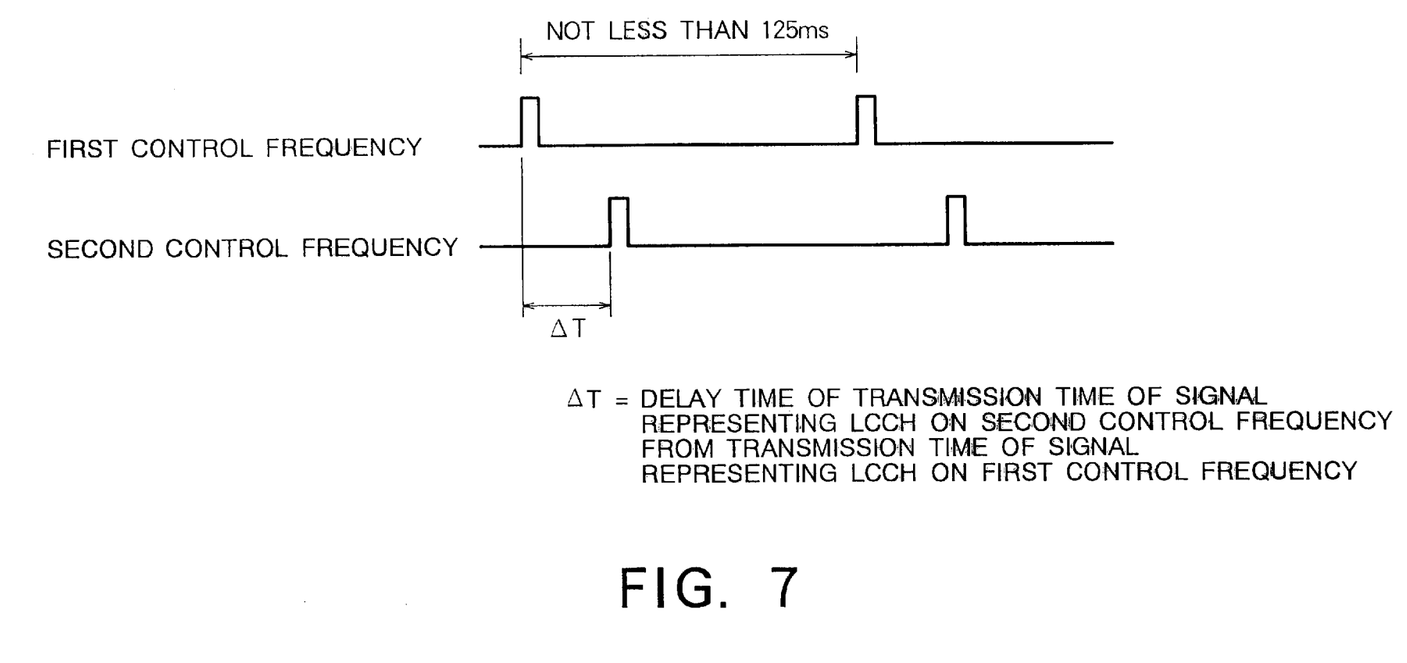
FIG. 7 is a timing chart illustrating a delay time of the transmission time of a control signal, which represents LCCHs and has a second control frequency, from the transmission time of a control signal representing LCCHs and having a first control frequency.

The data held in the LCCH timing memory unit 117 indicates the value of $\Delta T$ shown in FIG. 7. The two frequencies are respectively referred to as first and second control signals. This $\Delta T$ is a delay time between the transmission time of the control signal representing the LCCH transmitted at the first control frequency and the transmission time of the control signal representing the LCCH transmitted at the second control frequency.

Figure 8:
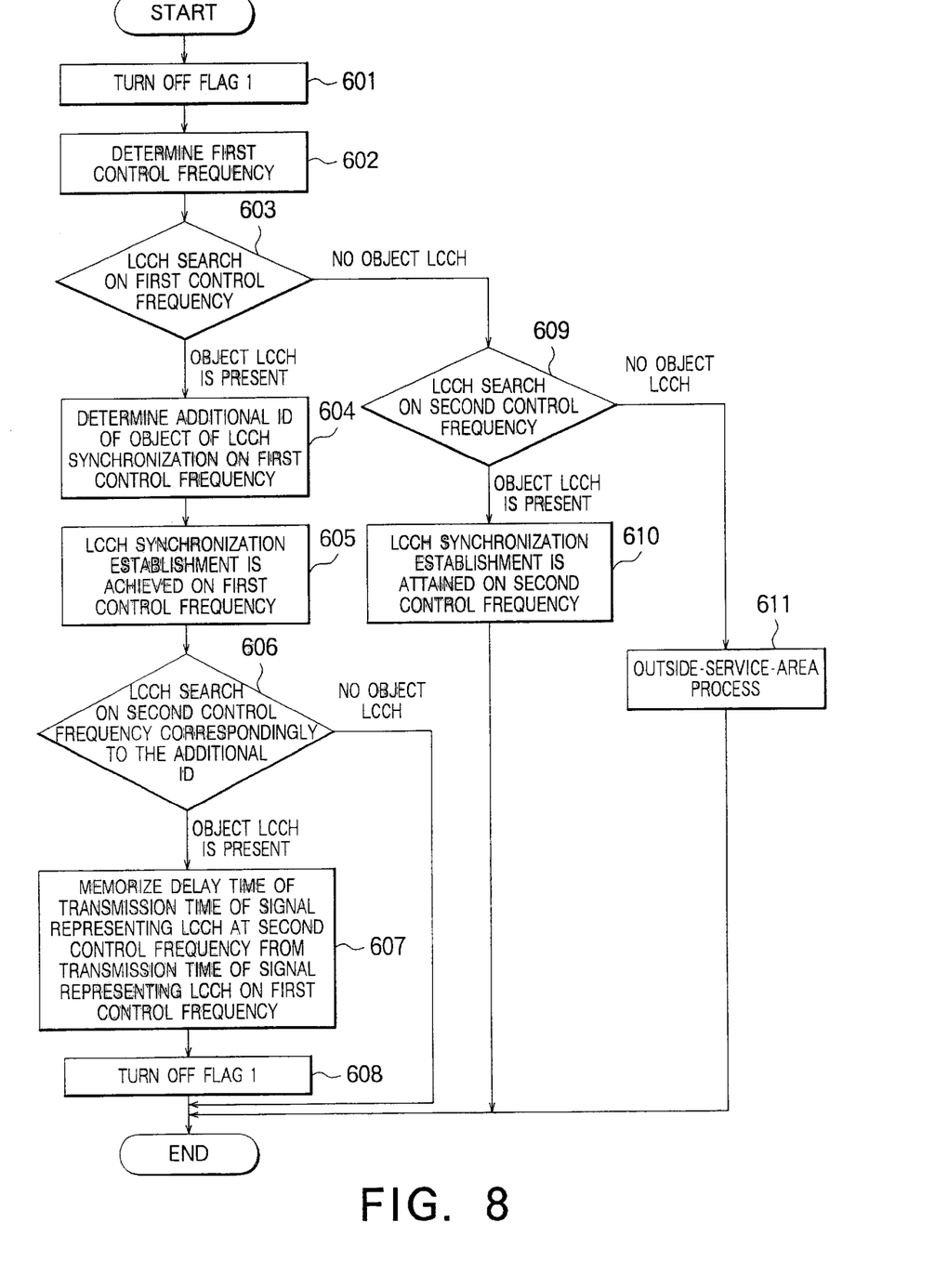
FIG. 8 is a flowchart illustrating a procedure for a LCCH search made on control signals of two different control frequencies according to the present invention.

FIG. 8 is a flowchart illustrating the procedure for searching the LCCHs having the two control frequencies, respectively. This procedure will be described hereinbelow with reference to FIG. 8. Incidentally, the two control frequencies are referred to as the first and second control frequencies, respectively. Additionally, the flag 1 shown in FIG. 8 indicates a state in which the data representing the delay time between the synchronization times respectively corresponding to the first and second control frequencies is written to the LCCH timing memory unit 117.

First, the flag 1 is turned off before the LCCH search (in step 601).

Then, a preferential control frequency predetermined correspondingly to each PS is determined as a first control frequency (in step 602). Subsequently, the LCCH search is performed at the first control frequency (in step 603). In the case that there is a match in ID, which indicates the allowance/inhibition of communications, between the BS and the PS and that a plurality of control signals including LCCHs (referred to as "object LCCHs") having the electric field strength, which is not less than a predetermined threshold value, are found, the system selects the LCCH having the highest reception electric field strength and memorizes the additional ID (in step 604). The reception of control signals is synchronized with this LCCH, so that the PS is brought into a wait state (in step 605).

In the case of the conventional mobile radio station, the LCCH search is completed at this stage. However, the mobile radio station of the present invention performs the LCCH search on the control signals at the second control frequency after the selection of the LCCH having the first control frequency (in step 606). At that time, as described above, the LCCH search is performed on the control signals sent from the BSs having the additional ID, which is the same with the additional ID of the BS corresponding to the LCCH selected at the first control frequency. An additional ID is peculiar to one of the BSs. Thus, if the additional ID is same, signals representing this LCCH are obtained from the same BS.

The LCCH search for the second control frequency is performed on control signals in a time period except the LCCH synchronization time corresponding to the first control frequency, because the reception of the control signals is synchronized with the LCCH selected correspondingly to the first control frequency. The transmission times of control signals of the two control frequencies transmitted from the same BS are controlled by this BS in such a manner as not to coincide with each other.

In the case that an object LCCH is detected correspondingly to the second control frequency, the LCCH timing memory unit 117 memorizes data representing the delay time between the synchronization times of the LCCHs respectively having the first and second control frequencies (in step 607). Then, the flag 1 is turned on (in step 608).

Thus, at both of the first and second control frequencies, object LCCHs corresponding to the same BS can be detected by using the flag 1. When the corresponding synchronization time is memorized in the LCCH timing unit 117, the flag 1 is turned on.

Therefore, if no object LCCH is found in the LCCH search for the second control frequency (see step 606), data is not written to the LCCH timing memory unit 117 in step 607. Thus, the flag 1 is not turned on in step 608.

In the case that no object LCCH is found by the LCCH search for the first control frequency (in step 603), the PS of the present invention performs the LCCH search for the second control frequency (in step 609), similarly as the conventional mobile radio station does.

If an object LCCH is found, the LCCH synchronization establishment is performed at the second control frequency (in step 610). However, the PS of the present invention does not perform the writing of the delay time to the LCCH timing memory unit 117 and the turning-on of the flag 1. If no object LCCH is found by the LCCH search for the second control frequency (in step 609), the PS of the present invention performs the outside-the-area process (in step 611).

Figure 9:
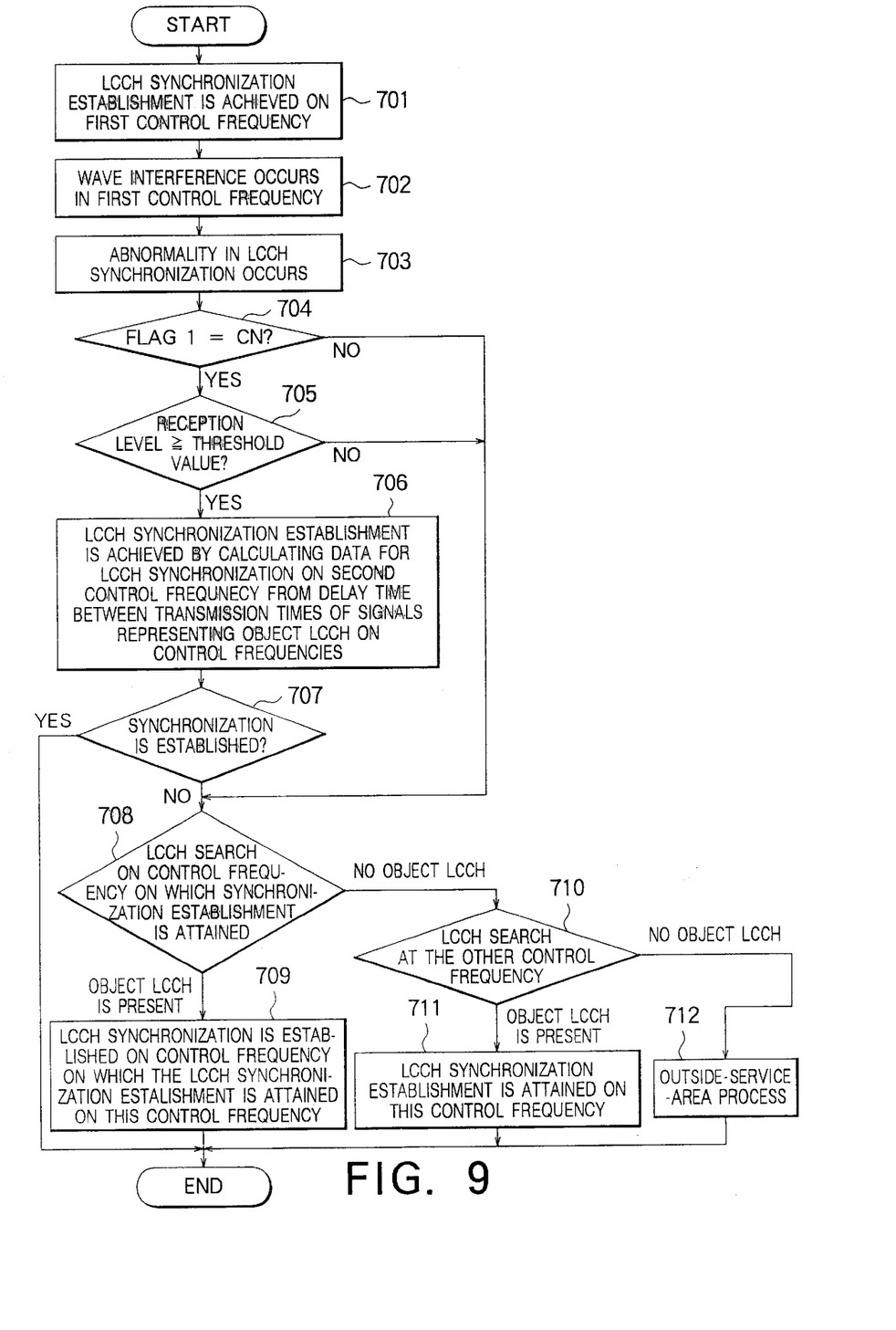
FIG. 9 is a flowchart illustrating a procedure for the case that an abnormality in the LCCH synchronization state occurs owing to wave interference in the mobile radio station of the present invention.

FIG. 9 is a flowchart illustrating the procedure to be performed in the case that an abnormality in the LCCH synchronization occurs owing to wave interference in an embodiment of the present invention. An operation of the PS, which is a feature of the present invention, in the case of an occurrence of an abnormality in the LCCH synchronization owing to wave interference will be described hereunder by referring to FIG. 9.

Upon completion of the LCCH searches for the first and second control frequencies respectively, the PS establishes the synchronization between the reception of control signals and the LCCH for the first control frequency (in step 701), when the LCCH timing memory unit 117 has the data.

In the case that wave interference with the LCCH synchronization time is caused (in step 702), an abnormality in the LCCH synchronization occurs (in step 703).

If the flag 1 is on when the condition of the flag 1 is checked (in step 704), the CPU 114 decides (in step 705) whether the reception electric field strength of the control signal representing the object LCCH is not less than a threshold value just before the PS undergoes the interference.

When an abnormality in the LCCH synchronization occurs owing to wave interference, an error rate of the reception signal increases but the electric field strength thereof is sufficiently high. On the other hand, when an abnormality in the LCCH synchronization is caused by an increase in distance from the BS transmitting control signals, the error rate increases and the reception electric field decreases.

If the reception electric field strength is not less than a threshold value (namely, an abnormality in the LCCH synchronization occurs owing to wave interference), the CPU 114 calculates timing data for synchronizing with the LCCH having the second control frequency on the basis of the delay time data, which is held in the LCCH timing memory unit 117, of the LCCH having the second control frequency for the transmission timing of the control signal having the first control frequency. Then, the CPU 114 controls the timing generation unit 115 and the frequency changing unit 112 and achieves the LCCH synchronization establishment correspondingly to the. second control frequency (in step 706).

When synchronization establishment is achieved, the PS is brought into a wait state. Conversely, when the PS fails in the synchronization establishment, the PS starts performing an ordinary LCCH search procedure (in steps 707 to 712).

When the flag 1 is off (in step 704), or when the reception electric field strength is less than the threshold value (in step 705), the PS commences performing the ordinary LCCH search procedure (in steps 708 to 712).

As described above, in the case of the conventional business PHSs, ever time an abnormality in the LCCH synchronization occurs, the LCCH search operation is performed. During this LCCH search operation, the PS cannot perform call origination and acceptance. In contrast, in the case of the PHSs according to the present invention, even when the interference occurs at one of the control frequencies, the LCCH synchronization establishment is immediately achieved at the other control frequency. Thus, the present invention prevents the PS from being into a state in which the PS cannot perform call origination and acceptance.

The reason is as follows. According to the present invention, the PS latches data indicating the transmission times of control signals, which represent the object LCCH, having the two control frequencies. Thus, even when the interference occurs at one of the control frequencies, the LCCH synchronization establishment is immediately attained at the other control frequency. Consequently, even when wave interference causes an abnormality in the LCCH synchronization, the PS of the present invention substantially eliminates the risk of an occurrence of a time in which the PS cannot achieve call origination and acceptance. Because the wave interference between the control signals transmitted from the BSs of different systems is the interference between the control signals intermittently transmitted therefrom, substantially, there is no the risk of the interference between the control signals having the control frequency being different from the control frequency of the control signals which the interference occurs.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A PHS mobile radio station comprising:

time difference information latching means for latching time difference information which is indicative of a difference between transmission times of signals respectively corresponding to logical control channels which are transmitted from connection units on first and second control frequencies and a controller for re-establishing synchronization with a logical control channel corresponding to the first control frequency in response to the time difference information, when an abnormality of synchronization occurs with the logical control channel corresponding to the second control frequency such that call origination and acceptance capability is maintained.

2. A PHS mobile radio station comprising:

a memory for at least one of (a) memorizing and (b) latching delay time information indicative of a delay time between transmission timings of signals respectively corresponding to first and second logical control channels, the signals being transmitted from connection units on first and second control frequencies; and a controller for obtaining timing data from the delay time information, the controller being latched by the memory means, for establishing synchronization with the first logical control channel, when wave interference occurs between the first and second logical control channels and a synchronization abnormality of one of the logical control channels occurs when synchronization with the second logical control channel is established, the controller controlling timing generation means and frequency changing means so as to establish synchronization with the first logical control channel such that call origination and acceptance capability is maintained.

3. A PHS mobile radio station comprising:

a receiving unit for receiving control signals transmitted from the connection unit provided in the vicinity of the mobile radio station a frequency changing unit;

a reception electric field strength detecting unit for measuring electric field strength of each of the received plural control signals;

a reception signal error detecting unit for detecting an error rate corresponding to the logical control channel;

a timing generation unit;

a CPU for controlling the frequency changing unit and for setting so that the receiving unit is able to receive signals at the control frequencies;

a timing memory unit for latching time difference information on a difference between transmission timings respectively corresponding to first and second logical control channels, which are transmitted from connection units on first and second control frequencies;

a demodulation unit; and a signal processing unit for recognizing data of the control signals as the logical control channels, wherein the CPU selects an optimum LCCH on the basis of logical control channel data sent from the signal processing unit, electric field strength information of a signal corresponding to each of the logical control channels, the electric field strength information being sent from the reception electric field strength detecting unit, and error rate information corresponding to each of the logical control channels, the error rate information being sent from the reception signal error detecting unit, and wherein the CPU calculates timing data for synchronizing with the first logical control channel from the time difference information, when a synchronization abnormality in the logical control channel occurs, and wherein the CPU controls the timing generation unit and the frequency changing unit so as to synchronize with the logical control channel operating at the second control frequency.

4. The PHS mobile radio station as claimed in claim 3, wherein a preferential control frequency predetermined corresponding to each mobile radio station is set as the first control frequency, wherein a search of logical control channel is performed at the first control frequency, wherein when there is a match in additional IDs to be referred for indicating one of (a) allowance and (b) inhibition of communications between the connection unit and the mobile radio station, and when a plurality of logical control channels each having electric field strength, the electric field strength being not less than a predetermined threshold value, are found as a result of the search, the logical control channel having highest electric field strength is selected and the additional ID corresponding thereto is memorized, wherein synchronization with the selected logical control channel is established, wherein the mobile radio station is brought into a wait state, wherein a search of the logical control channel corresponding to the second control frequency is performed after the first logical control channel, simultaneously with a search for an additional ID, the additional ID being the same as the additional ID assigned to the selected first logical control channel, and wherein when the second logical control channel is detected, the memory unit memorizes delay time data representing a delay time between the transmission time of a signal representing the second logical control channel and the transmission time of a signal representing the first logical control channel.

5. The PHS mobile radio station as claimed in claim 4, which further has a flag, wherein:

the flag is used for detecting the first and second-logical control channels connected to the same connection unit, and wherein the flag is turned on when the time delay information on the time delay of the second logical control channel corresponding to the second control frequency is memorized in the memory unit.

6. The PHS mobile radio station as claimed in claim 5, wherein:

the CPU decides whether the reception electric field strength of the logical control channel is not lower than a predetermined threshold value just before undergoing wave interference, when wave interference occurs at the transmission time of a signal representing the first logical control channel and a synchronization abnormality in the first logical control occurs, and wherein the CPU calculates timing data for synchronizing with the first logical control channel from the time difference information, when a synchronization abnormality in the logical control channel occurs, and wherein the CPU controls the timing generation unit and the frequency changing unit to synchronize with the logical control channel operating at the second control frequency.

7. The PHS mobile radio station as claimed in claim 5, wherein:

the CPU controls so that, when the flag is off, or when the reception electric field strength is lower than the threshold value, an ordinary control channel search operation is performed without synchronizing with the second logical control channel.

* * * * *